United States Patent [19]

Surace

[11] 4,429,671
[45] Feb. 7, 1984

[54] DEVICE FOR AUTOMATICALLY ADJUSTING THE ROTATIONAL SPEED OF AN INTERNAL COMBUSTION ENGINE WHEN OPERATING UNDER IDLING CONDITIONS

[75] Inventor: Filippo Surace, Milan, Italy

[73] Assignee: Alfa Romeo S.p.A., Milan, Italy

[21] Appl. No.: 336,273

[22] Filed: Dec. 31, 1981

[30] Foreign Application Priority Data

Jan. 9, 1981 [IT] Italy .............................. 19068 A/81

[51] Int. Cl.³ .............................................. F02P 5/04
[52] U.S. Cl. .................................. 123/339; 123/407; 123/418
[58] Field of Search ....................... 123/339, 407, 418

[56] References Cited

U.S. PATENT DOCUMENTS

| | | | |
|---|---|---|---|
| 3,800,759 | 4/1974 | Cedar | 123/339 |
| 4,168,691 | 9/1979 | Sawada et al. | 123/407 |
| 4,328,775 | 5/1982 | Ironside | 123/339 |
| 4,338,899 | 7/1982 | Geiger et al. | 123/339 |

FOREIGN PATENT DOCUMENTS 1255467 12/1971 United Kingdom ............... 123/407

*Primary Examiner*—Andrew M. Dolinar
*Attorney, Agent, or Firm*—Charles E. Brown

[57] ABSTRACT

The invention relates to a device for automatically adjusting the spark advance for controlling the idling r.p.m. in an internal combustion engine, of the type controlled by first sensor means connected by a first connection to the intake duct upstream of the throttle valve. Said device also comprises a second connection to said duct downstream of said valve, said second connection being controlled by a solenoid valve controlled by second sensor means for determining the engine rotational speed, and third sensor means for determining the throttle valve position.

4 Claims, 3 Drawing Figures

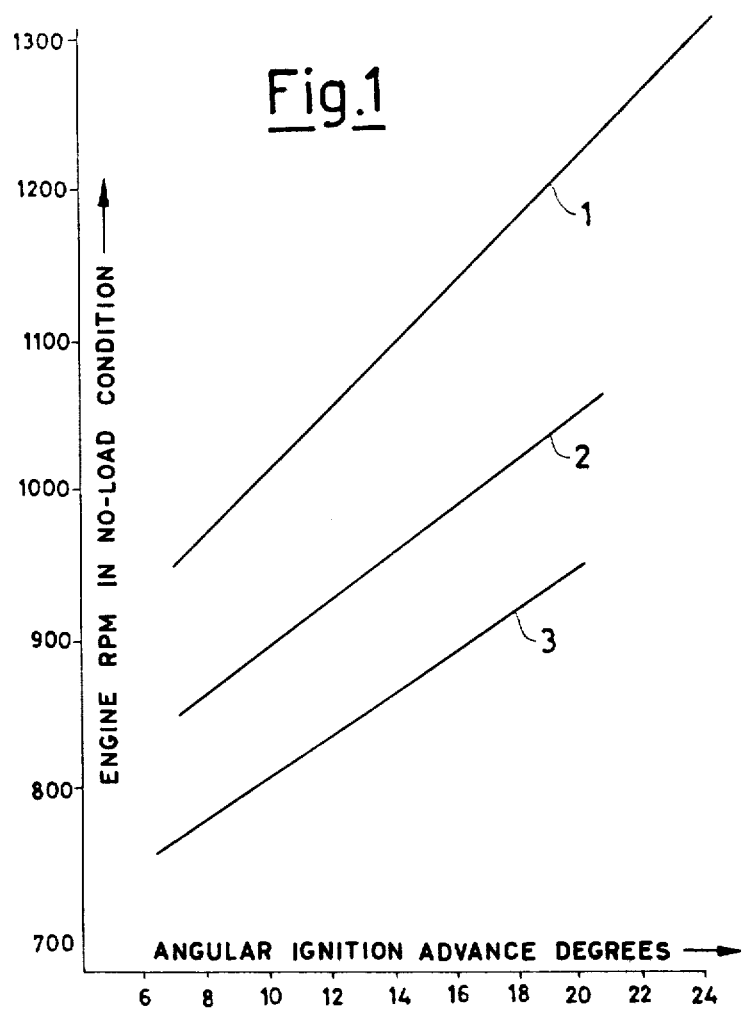
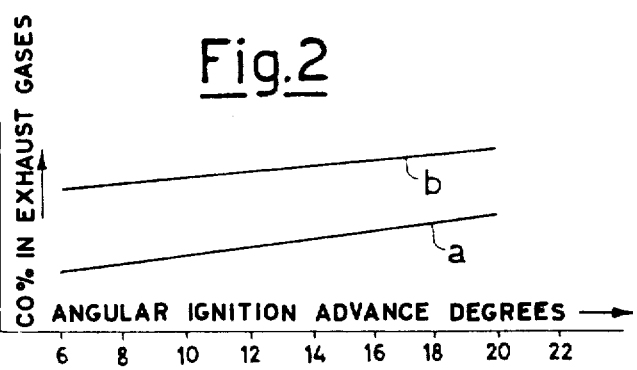

DEVICE FOR AUTOMATICALLY ADJUSTING THE ROTATIONAL SPEED OF AN INTERNAL COMBUSTION ENGINE WHEN OPERATING UNDER IDLING CONDITIONS

During the normal use of an internal combustion engine, especially of a motor vehicle, it is well known that there are frequent situations, often somewhat prolonged in time, during which power is not required from the engine, but the engine is kept rotating, and thus idling, so that it is ready to supply power as soon as required.

When the engine is idling, its rotational speed, expressed for example as the number of revolutions made by the shaft in one minute, is that at which the drive torque deriving from the thermodynamic cycle equals the resistant torque deriving from the internal engine friction and the driving of the accessories connected to the engine. In order to reduce not only the engine noise when idling but also its fuel combustion and atmospheric pollution, said rotational speed when idling must be as low as possible. In fact, this speed is also known as the "minimum r.p.m.". In order to reduce the idling r.p.m., on the basis of that stated heretofore, the drive torque must be as low as possible. This is attained by reducing the density of the intake air (and thus the weight of fuel, which is proportional to said density) by means of the throttle valve or valves.

When the accelerator pedal is released, the throttle valve connected to the accelerator thus assumes its maximum closure position defined by contact between a lever rigid with the throttle valve spindle and the end of a screw known as the "idling adjustment screw".

Although machining tolerances on all the special engine components are close, and the operational tests on the various devices are severe, the possible differences in the values of the drive torques deriving from the thermodynamic cycle and those of the internal engine resistant torques are such as to require that the said adjustment screw be adjusted for each new mass-produced engine in order to obtain the idling r.p.m. which is fixed as optimum. After a certain period of engine operation, on account of its running-in, i.e. the settling of the internal working surfaces (also an effect which varies from one engine to another), a further adjustment of the adjustment screw is generally necessary for new engines.

In this manner, all operating engines are able to run with an idling r.p.m. which is within a fairly narrow range of values about the value fixed as optimum. However, the actual value can be much lower than this value when the motor has been started but has not yet reached its normal operating temperature (especially in the case of low ambient temperatures). This is because when the lubricating oil and cooling water temperatures are low, the internal engine resistant torques are considerably higher. Further reductions in the idling r.p.m. can occur if the motor is required to drive certain accessories such as the cooling fluid compressor for the vehicle air conditioning system. To prevent such r.p.m. reductions giving rise to irregular idling or even to stoppage of the engine, said idling r.p.m., for an engine already up to normal operating temperature and not burdened by driving possible accessories, is set by the manufacturer at a considerably higher level than the optimum value. It follows that for the major part of the engine operation during the life of the vehicle, the noise, fuel consumption and atmospheric pollution are considerably higher than they need be when operating under idling conditions.

The device according to the present invention obviates this drawback while at the same time dispensing with, or minimising the number of, adjustments of the throttle stop screw (as heretofore stated). This device derives from the consideration that the spark advances normally used for an engine operating at its idling r.p.m. is considerably less than that for which its derive torque deriving from the thermodynamic cycle is a maximum. In this respect, the choice of this spark advance depends essentially on the existence of other situations and problems which cannot be neglected. Larger spark advances would require closer levels of throttle closure and much greater accuracy in the carburettor construction. They would give rise to greater exhaust emission because of the higher internal recycling, and could not constitute an easy commencement point for the curve relating the spark advances required by the engine to the r.p.m. when the engine is in normal use. By using the device according to the present invention, these situations and problems are taken into account in the sense that when the engine is up to normal operating temperature and not required to drive any accessories, the value of the spark advance assumes normal values, whereas it is automatically increased when because of the fact that the engine is not yet up to normal operating temperature or is required to drive accessories, the rotational speed tends to fall below the prescribed value. The increase in drive torque caused by the increase in the spark advance is thus adjusted automatically such as to maintain the rotational speed essentially equal or very close to the predetermined value in all cases.

IN THE DRAWINGS

FIG. 1 is a graph plotting engine r.p.m. against ignition advance.

FIG. 2 is a graph plotting CO% in exhaust gases against ignition advance.

Figure 3:
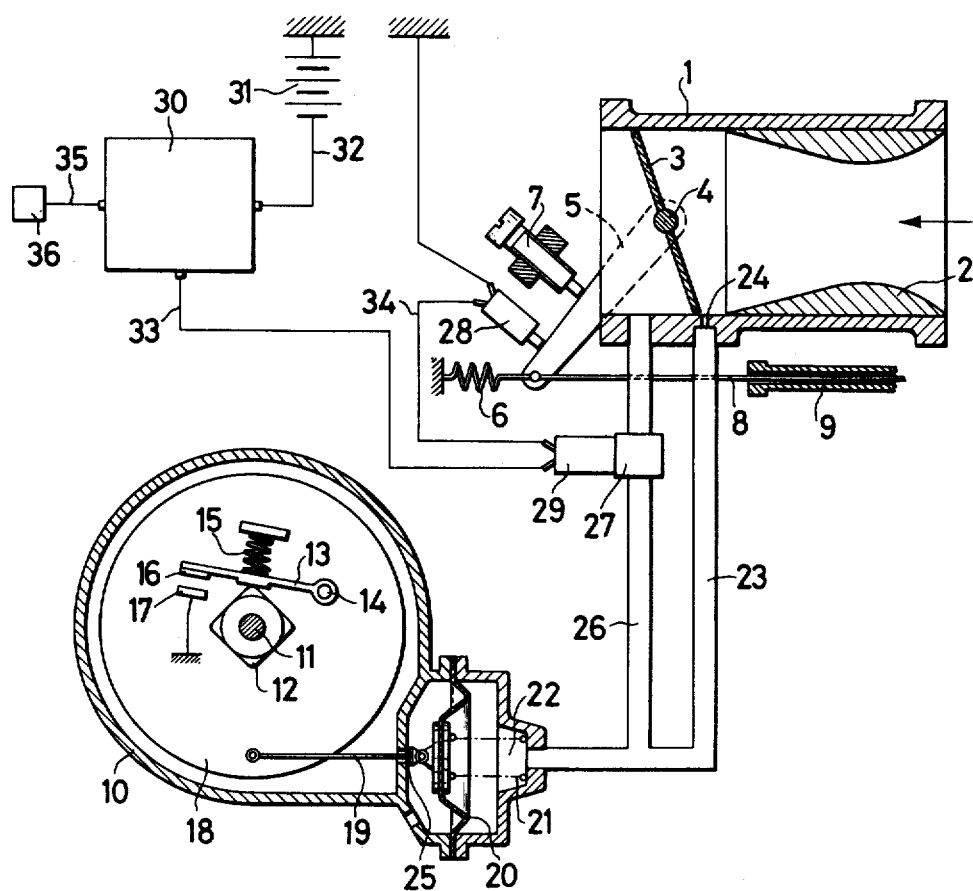
FIG. 3 is a schematic showing of the invention with parts in section of the invention in relation to the ignition system of the throttle control of an engine.

The possibility of using the variation in the spark advance for influencing the idling r.p.m. of the engine has been confirmed experimentally, and the results obtained on a normal motor vehicle engine are shown in the graph of FIG. 1. In this graph, the ordinate represents the r.p.m. values obtained as a function of the spark advance values, which are shown on the abscissa. Line 1 relates to an adjustment of the angle of closure of the throttle valve such as to obtain a rotational speed of 950 r.p.m. with a spark advance of 6° and with the engine at normal operating temperature. Using this same angle of closure of the throttle valve, the spark advance was gradually increased, so obtaining the r.p.m. values indicated by line 1. Lines 2 and 3 are similar lines obtained for different angles of closure of the throttle valve, such as to obtain rotational speeds of 850 and 750 r.p.m. respectively, with a spark advance of 6°.

The use of the spark advance for influencing the engine idling r.p.m. so as to maintain it at a constant value equal to the optimum value thus enables any adjustment of the angle of closure of the throttle valve as a means for adjusting the rotational speed to be dispensed with. In fact, the use of this traditional adjustment generally leads to the difficulty of keeping the mixture ratio constant and correspondingly optimum (both for consumption and emission) if the engine is fed by a carburettor (as happens in most cases).

In this respect, the mixture ratio generally varies as the throttle valve closure angle varies, unless the idling mixture adjustment screw is also adjusted (so much so that the position of the edge of the throttle valve plate is also used to modify the operation of the so-called carburettor progression bores). Adjusting the spark advance obviously does not change the mixture ratio. In this respect, the curve 3 of FIG. 1 includes, shown along it as a function of the spark advance angle, the carbon monoxide content of the exhaust gas (expressed as CO%) shown in FIG. 2, in which curve a corresponds to a fuel adjustment which gives about 1% of CO at 750 r.p.m. with a 6° spark advance, and curve b corresponds to an adjustment which gives about 2.2% of CO under the same r.p.m. and spark advance conditions. The CO% variations along the two curves are very small, and depend only on the variation in r.p.m.. If the r.p.m. remains constant (as happens with the proposed device, in that the spark advance is increased as the friction and motor drive resistance increases), the CO% remains completely constant. The device thus completely solves the ecological problem of CO% emission in the exhaust, for which legislation poses limits on the CO% variations deriving from normal idling r.p.m. adjustments (based on the variation in the degree of closure of the throttle valve).

A preferred embodiment of the device according to the present invention, based on the aforesaid technical concepts, is illustrated hereinafter with reference to the schematic diagram of FIG. 3. In FIG. 3, the reference numeral 1 indicates a duct through which the engine intake air passes in the direction indicated by the arrow. If the engine is of the carburation feed type, said duct is that inside the carburettor, characterised by the presence of a Venturi restriction 2 in the air passage, for drawing in the petrol (through ducts not shown on the drawing). The normal throttle valve 3 for the engine intake mixture is disposed in a cylindrical portion of the duct 1. Said throttle valve is rotated by its spindle 4 which is rigid with the lever 5, to the end of which is connected the resilient spring indicated by 6 which tends to rotate the throttle valve 3 in the sense of closing the passage cross-section of the mixture in the duct 1. To the same end of the lever 5 is connected the end of the cable 8 which slides in a sheath 9 and is axially connected to the accelerator pedal. When the accelerator pedal is released, the degree of closure of the throttle valve 3 is determined by contact between the lever 5 and the end of the adjustment screw 7 (idling screw).

The degree of closure of the throttle valve 3 governs the quantity of engine intake air when under idling conditions, and thus the engine idling r.p.m. when the pedal is released. The described adjustment is entirely traditional, and is effected in a line manner for an injection engine. Also traditional is the device for adjusting the spark advance as a function of the engine intake suction pressure, shown in FIG. 3. The figure shows the outer casing 10 of a normal ignition distributor, with the spindle 11 rotated at an r.p.m. value which is one half that of the engine. The cam 12, comprising a number of lobes equal to the number of engine cylinders, is driven by the spindle 11. The contact breaker 13 is provided at 14, and is urged by the spring 15 such that the contact 16 rigid with the end of the contact breaker 13 is kept adhering to the earth contact 18, and separates therefrom only when one of the lobes of the cam 12 acting on the circuit breaker 13 overcomes the load of the spring 15. The circuit breaker support plate 18 which can rotate about the axis of the spindle 11 is also entirely traditional, its angular position relative to the spindle and thus relative to the engine shaft being determined by the tie rod 19 which is connected at one end to the periphery of said plate and at the other end to the centre of a diaphragm 20. The position of this diaphragm depends on the equilibrium between the load of a spring 21 and the pressure difference acting on it, due to the suction pressure in the cavity 22 which acts on one face of the diaphragm, and atmospheric pressure which acts on its other face. The cavity 22 is connected by the small conduit 23 to the bore 24 provided in the conduit 1, the position of this cavity being completely traditional, such that when the pedal is released and the throttle valve is in its maximum closure position, the pressure in the cavity 22 is that of the outside environment, whereas after a small rotation of the throttle valve in the opening direction, the edge of the throttle valve plate is moved upstream of the bore such that the cavity 22 is at the engine intake suction pressure. In this manner, with the pedal released and thus with the engine running idly, the spring 21 keeps the diaphragm 20 and tie rod 19 in the fixed position determined by the limit stop 25, and correspondingly the circuit breaker support plate 18 is kept in the constant idling spark advance position, whereas with the throttle valve more open to correspond to the engine driving the vehicle at modest speed and with modest acceleration, the suction pressure in the cavity 22 causes the circuit breaker support plate 18 to rotate in the direction of increasing the spark advance, this latter then assuming the fairly high values required for minimising the specific consumption under such modest vehicle speed and acceleration conditions.

The adjustment of the spark advance under other engine operating conditions with greater throttle valve openings and higher r.p.m. values takes place in an entirely traditional manner, controlled by said diaphragm and by the normal centrifugal masses, not shown.

According to the present invention, the small conduit 26 branches from the conduit 23 and communicates with the engine intake duct in a zone downstream of the throttle valve 3, and is fitted with a small valve indicated by 27 operated by the electromagnet 29. The reference numeral 28 indicates a switch connected to the electromagnet 29 by the cable 34, and located in proximity to the lever 5 so as to be closed when the pedal is released and open even at throttle valve opening angles which are modest, but are greater than those corresponding to engine idling. The reference numeral 30 indicates an electronic circuit supplied by the normal vehicle battery 31 through the cable 32, and is connected by the cable 33 to the electromagnet 29. Current can pass through this latter from the circuit 30 by way of the cable 33 when the switch 28 is in its closed position, i.e. when the accelerator pedal is released. The electronic circuit 30 is also connected by the cable 35 to a speed sensor, for example of the magnetic type indicated by 36, which is operationally connected to the drive shaft. The electric signals reaching the electronic circuit 30 from the sensor 36 enable the circuit to evaluate the engine r.p.m. at all times. When the accelerator pedal is released, and thus with the switch 28 in the closed position, if the engine idling r.p.m., as evaluated by a threshold comparator of the electronic circuit, is less than a predetermined optimum, the electronic circuit is designed to feed current to the electromagnet 29, which thus becomes energised and opens the small valve 27. Because the conduit 26, like the traditional conduit 23, is also in communication with the cavity 22, then because of the small dimensions of the bore 24 the opening of the valve 27 gives rise to a suction pressure in the cavity 22 because of the suction pressure existing in the duct 1 downstream of the throttle valve 3, so that the diaphragm moves in the direction of increasing the spark advance. The relationship governing the suction pressure variation in the cavity 22 depends on the dimensioning of said cavity 22, and of the passage port uncovered by the solenoid valve 29 in the conduit 26, and thus the speed of response of the system and the frequency of operation of the solenoid valve 29 depend on this dimensioning. Said increase in spark advance leads to an increase in the engine idling r.p.m., as stated at the beginning of this description, and this continues until the r.p.m. which has been fixed as optimum is attained. This is obviously because as soon as the engine r.p.m. exceeds the predetermined value, the electronic circuit interrupts current to the electromagnet 29, and the suction in the cavity 22 tends to reduce by the effect of the conduit 23 and bore 24. In this manner, by suitably dimensioning the valve 27 and bore 24, the engine idling r.p.m. can be kept within a very narrow range of values, independently of both the internal engine resistance and the application of loads (such as the air conditioning system compressor).

I claim:

1. A device for automatically adjusting a spark advance of an ignition system for controlling the idling r.p.m. of an internal combustion engine, said device being of a type controlled by a first sensor means of a pneumatic kind comprising a sealed cavity, a membrane in said cavity, and elastic means acting on said membrane, switch means adapted to control said ignition system, said membrane being operatively connected to said switch means, said cavity being connected by a first conduit to an intake manifold for air aspirated by the engine upstream of a throttle valve positioned in said intake manifold and being connected by a second conduit to the said intake manifold downstream of said throttle valve, said second conduit being controlled by an electrically operated valve controlled by second sensor means which senses engine speed and by third sensor means which senses the position of said throttle valve.

2. In an ignition system for an internal combustion engine, a system for controlling spark timing comprising: a rotary distributor,
    (a) means for interrupting current to said ignition system at the moment in which the angular position of said rotary distributor is characterised by a predetermined value of a spark advance angle relative to the position corresponding to the end-of-compression dead center position of the engine; and
    (b) said timed interruption taking place at pre-determined spark advance values in relation to the rotational speed and to the degree of throttling of the engine feed by virtue of the fact that said means for interrupting the current are operationally connected to a pneumatic device which provides for the required variations in the spark advance angle as a function of the suction pressure in an engine intake duct and as a function of the angle of opening of a throttle valve having a plate, said pneumatic device including a cavity having therein a mobile wall the position of which is determined by the equilibrium between the resultant of the pressures on its surface and the loading of an elastic element;
    a first small conduit providing communication between said pneumatic device and a point in said intake duct which is in proximity to an edge of said throttle valve and in a position such that it lies upstream of said throttle valve plate when said throttle valve is closed, whereas when said throttle valve is just open and at greater degrees of opening it lies downstream, i.e. in the zone in which suction pressure is induced by said throttle valve;
    a second small conduit providing communication between that zone in said engine intake duct which is always downstream of said throttle valve plate and said cavity in said pneumatic device;
    a normally closed solenoid valve connected into said second conduit so as to vary the suction pressure in said cavity;
    a normally open electrical switch operationally connected to said solenoid valve, and which is closed when the throttle valve reaches its position of maximum closure;
    an electronic circuit operationally connected to said solenoid valve and to a sensor for determining engine rotational speed, said circuit comprising a threshold comparator able to evaluate whether the engine rotational speed is greater or less than a predetermined minimum value, and able to emit a signal for energising said solenoid valve when said rotational speed is less than said predetermined minimum value.

3. An ignition system as claimed in claim 2, together with a battery and characterised in that said electrical switch, the actuation of which depends upon whether said throttle valve is in its position of maximum closure or not, is connected into a cable which supplies said electronic circuit from said battery.

4. An ignition system as claimed in claim 2, together with a battery and characterised in that said electrical switch, the actuation of which depends upon whether said throttle valve is in its position of maximum closure or not, is connected into a cable which supplies said solenoid valve from said battery.

* * * * *